United States Patent [19]

Heidlas et al.

[11] Patent Number: 5,750,180
[45] Date of Patent: May 12, 1998

[54] PROCESS FOR OBTAINING LIPID FRACTIONS FROM EGG PRODUCTS IN POWDER FORM

[75] Inventors: Jurgen Heidlas, Trostberg; Jan Cully, Garching; Franz Michlbauer, Kirchweidach; Heinz-Rudiger Vollbrecht, Altenmarkt, all of Germany

[73] Assignee: SKW Trostberg Aktiengesellschaft, Trostberg, Germany

[21] Appl. No.: 513,911

[22] PCT Filed: Mar. 14, 1994

[86] PCT No.: PCT/EP94/00793

§ 371 Date: Sep. 7, 1995

§ 102(e) Date: Sep. 7, 1995

[87] PCT Pub. No.: WO94/21763

PCT Pub. Date: Sep. 29, 1994

[30] Foreign Application Priority Data

Mar. 15, 1993 [DE] Germany .................. 43 07 980.6

[51] Int. Cl.$^6$ .................. A23L 1/32; C07F 9/02
[52] U.S. Cl. .................. 426/614; 426/425; 426/429; 426/417; 554/83; 554/206
[58] Field of Search .................. 426/605, 613, 426/614, 425, 429, 417; 554/83, 206

[56] References Cited

U.S. PATENT DOCUMENTS

| | | |
|---|---|---|
| 5,024,846 | 6/1991 | McLachlan et al. |
| 5,288,619 | 2/1994 | Brown et al. .................. 426/601 |
| 5,466,842 | 11/1995 | Heidlas et al. .................. 426/605 |
| 5,616,352 | 4/1997 | Heidlas et al. .................. 426/614 |
| 5,616,359 | 4/1997 | Heidlas et al. .................. 426/614 |

FOREIGN PATENT DOCUMENTS

| | | |
|---|---|---|
| 0503293 | 9/1992 | European Pat. Off. |
| 0531104 | 3/1993 | European Pat. Off. |
| 4139398 | 1/1993 | Germany |
| WO8702697 | 5/1987 | WIPO |
| WO9401004 | 1/1994 | WIPO |

OTHER PUBLICATIONS

Database Abstract AN 94–112057 for JP 6058934 Pub. Mar. 4, 1994.

*Primary Examiner*—Anthony J. Weier
*Attorney, Agent, or Firm*—Felfe & Lynch

[57] ABSTRACT

A process is described for obtaining lipid fractions from egg products in powder form with a content of phospholipids in which the egg product is a) firstly extracted with liquid propane at a pressure of $\leq 200$ bar and a temperature of $\leq 70°$ C. and b) subsequently with a mixture of liquid propane and an entraining agent composed of an aliphatic alcohol with 1 to 4 C atoms. In this way it is possible to produce lipid fractions with good sensory properties whose content of phospholipids is at least 25% by weight and up to 80% by weight.

15 Claims, No Drawings

PROCESS FOR OBTAINING LIPID FRACTIONS FROM EGG PRODUCTS IN POWDER FORM

DESCRIPTION

The present invention concerns a process for obtaining lipid fractions from egg products in powder form with a high content of phospholipids.

Egg-based lipid fractions have a variety of uses in the food sector (in particular in the production of dietary products) as well as in the pharmaceutical and cosmetic industry due to their physiological and functional properties. With regard to nutritional physiology those lipid fractions are particularly interesting which have a high content of phospholipids (lecithin) since these fractions contain valuable polyunsaturated fatty acids above all arachidonic acid.

These lipid fractions have been obtained from egg products according to previously known processes (cf. for example EP-A 74251) by extraction with organic solvents such as e.g. chloroform or acetone. Apart from the fact that the extraction in any case has to be carried out in several steps, the solvents used have the disadvantage that the respective solvent residues are a risk to health. In addition they can cause changes in the taste of the products concerned (in particular in the case of acetone) resulting in a major impairment of their sensory quality.

The object of the present invention is therefore to develop a process for obtaining powdery lipid fractions from egg products which does not have the said disadvantages of the state of the art but which enables lipid fractions to be obtained in a technically simple procedure with a relatively high content of phospholipids and good sensory properties.

This object is achieved according to the invention by extracting the egg product a) with liquid propane at a pressure of $\leq 200$ bar and at a temperature of $\leq 70°$ C. and b) subsequently with a mixture of liquid propane and an entraining agent composed of an aliphatic alcohol with 1 to 4 C atoms.

Surprisingly it turned out that lipid fractions with a phospholipid content of more than 20% by weight and having good sensory properties can be gently produced with the aid of this solvent mixture. The process according to the invention uses powdery egg-based products such as e.g. egg-yolk powder or whole egg powder or products which contain these materials that have a phospholipid content which is worthwhile to process, preferably of at least 5% by weight. It is essential for the invention that the extraction is carried out with propane in a liquid state at a pressure of $\leq 200$ bar and at a temperature of $\leq 70°$ C. (step a) and subsequently with a mixture of liquid propane and an entraining agent composed of an aliphatic alcohol with 1 to 4 C atoms (step b). The lower limit for pressure and temperature is determined by the requirement that the propane has to be used as a liquid for each selected temperature and pressure condition from the phase diagram of propane. The invention ensures that the fats as well as the phospholipids (especially lecithin) are dissolved in the extraction medium. Due to the sensitive properties of the other components of egg products in particular the proteins, the extraction in step a) is preferably carried out in a pressure range of 10 to 100 bar and at an extraction temperature between 20 and 60° C. In this way a denaturation of the proteins in the extraction residue is avoided so that this protein-rich egg fraction can also be utilized further. This first extraction step enables a "lecithin-poor" lipid fraction to be obtained with a phospholipid content of $\leq 15\%$ by weight. In the second extraction step (step b) the egg product is then extracted with a mixture of liquid propane and an entraining agent composed of an aliphatic alcohol.

In the process according to the invention short-chained aliphatic alcohols with 1 to 4 C atoms, namely methanol, ethanol, propanol, isopropanol, butanol, isobutanol or tertiary butanol are used as the entraining agent which is preferably used in an amount of 1 to 20% by weight relative to the amount of propane gas. For toxicological reasons ethanol is preferably used.

A "lecithin-rich" lipid fraction is obtained in this second extraction step b) which has a phospholipid content of at least 25% by weight. The extraction conditions such as pressure and temperature can be identical in step a) and b). The amount of propane gas used can be varied within wide limits and essentially depends on the amount of fats and phospholipids which has to be removed. As a rule 1 to 30 kg per kg starting material is usually sufficient for the respective extraction step to achieve a satisfactory yield of the desired lipid fraction. Within the scope of the present invention it is also possible to use propane in a mixture with butane. The butane addition can be up to 45% by weight.

Following extraction steps a) and b), the fats and phospholipids dissolved in the respective extraction medium can then be separated from the propane or propane/alcohol mixture by evaporation and/or pressure reduction.

A further possibility for separating the extracts from the extraction medium is to bring propane near to its critical state parameters ($P_k=42$ bar, $T_k=96°$ C.) whereby the desired separation is achieved. This variant of the process is particularly advantageous because no energy is necessary for the phase transition of the solvent (evaporation or condensation energy).

In a preferred embodiment, after extracting with addition of entraining agent, a re-extraction with propane (without entraining agent) is carried out to remove remains of entraining agent from the extracts and from the extraction residue which is preferably carried out in the same pressure and temperature range as the extraction. Complete separation of the entraining agent from the propane gas can be achieved according to conventional methods and using the known devices such as e.g. a droplet separator or appropriate filter systems so that the propane gas is again subsequently available for the extraction of the egg products after liquefaction and/or compression. In this way a small amount of propane gas can be continuously circulated which considerably increases the profitability of the process.

The process according to the invention enables the production of lipid fractions with good sensory properties from egg products in powder form whose content of phospholipids is up to 80% by weight.

The following examples are intended to elucidate the invention in more detail:

EXAMPLE 1

1 kg compressed propane is passed through 1000 g egg yolk powder (total fat: 60% by weight, fat: 45% by weight, phospholipid: 15% by weight) within 6 minutes at 20 bar and 45° C. in a 4 l pressure autoclave and the extract is drawn off as a first fraction from the separator after evaporating the propane. It is then extracted for 1 hour under the same extraction conditions with a further 10 kg propane to which 4% by weight ethanol is added as an entraining agent. After evaporating the propane the extract is collected in a separator, drawn off and the entraining agent is completely removed from the extract (fraction 2). The following results were analyzed:

Fraction 1: initial weight: 236 g fat (triglycerides): 85% by weight phospholipids: 13% by weight Fraction 2: initial weight: 304 g fat (triglycerides): 72% by weight phospholipids: 26% by weight

EXAMPLE 2

15 kg compressed propane is passed through 1000 g egg yolk powder (total fat: 60% by weight, fat: 45% by weight, phospholipid: 15% by weight) within 90 minutes at 40 bar and 40° C. in a 4 l pressure autoclave and the extract is drawn off as a first fraction from the separator after evaporating the propane. It is then extracted under the same extraction conditions for 30 minutes with a further 5 kg propane to which 6% by weight ethanol is added as an entraining agent. After evaporating the propane the extract is collected in a separator and the entraining agent is completely removed from the extract (fraction 2). The following results were analyzed:

Fraction 1: initial weight: 470 g fat (triglycerides): 86% by weight phospholipids: 12% by weight Fraction 2: initial weight: 110 g fat (triglycerides): 33% by weight phospholipids: 66% by weight

We claim:

1. A method for isolating a lipid fraction from an egg product in powdered form having phospholipids comprising:

(a) exposing said egg product to a liquefied gas consisting of propane and no more than 45 percent by weight butane at a pressure of $\leq$200 bar and a temperature of $\leq$70 ° C. to obtain a first extraction fraction and a first extraction residue.

(b) exposing said first extraction residue to an extraction mixture of an aliphatic alcohol having from 1 to 4 carbon atoms a liquefied gas consisting of propane and no more than 45 percent by weight butane to obtain a second extraction residue and a second extraction fraction; and (c) isolating a lipid fraction from said second extraction fraction obtained in step (b).

2. Process as claimed in claim 1, wherein the extraction in step a) is carried out at a pressure of 10 to 100 bar.

3. Process as claimed in claim 1 wherein the extraction temperature in step a) is between 20° and 60° C.

4. Process as claimed in claim 1, wherein the extraction in step b) is carried out at the same pressure and temperature range as in step a).

5. Process as claimed in claim 1 wherein said aliphatic alcohol of step b) comprises from 1 to 20% by weight compared to the weight of said liquefied gas of step b).

6. Process as claimed in claim 1, wherein said aliphatic alcohol is ethanol.

7. Process as claimed in claim 1 wherein from 1 to 30 kg of propane per kg of said egg product is used in each of the two extraction steps a) and b).

8. Process as claimed in claim 1, wherein said lipid fraction isolated in step c) is isolated by either evaporating said liquefied gas and said aliphatic alcohol from said second extraction fraction or reducing the pressure of said second extraction fraction.

9. Process as claimed in claim 1, further comprising exposing said second extraction residue and said second extraction fraction to liquefied gas to remove aliphatic alcohol from said second extraction residue and said second extraction fraction.

10. Process as claimed in claim 9, wherein said removal of said aliphatic alcohol from said second extraction residue and said second extraction fraction is carried out at the same pressure and temperature range as that recited in step b).

11. Process as claimed in claim 1, wherein said liquefied gas of step a) consist of a mixture of butane and propane.

12. Process as claimed in claim 1, wherein said aliphatic alcohol is selected from the group consisting of methanol, ethanol, propanol, isopropanol, butanol, isobutanol, and tertiary butanol.

13. Process as claimed in claim 1, wherein said aliphatic alcohol is butanol.

14. Process as claimed in claim 11, wherein said aliphatic alcohol is butanol.

15. Process as claimed in claim 1, where said liquefied gas consists of propane.

* * * * *